Jan. 8, 1929.  E. J. HALL  1,698,160
SHAFT COUPLING
Filed July 22, 1926
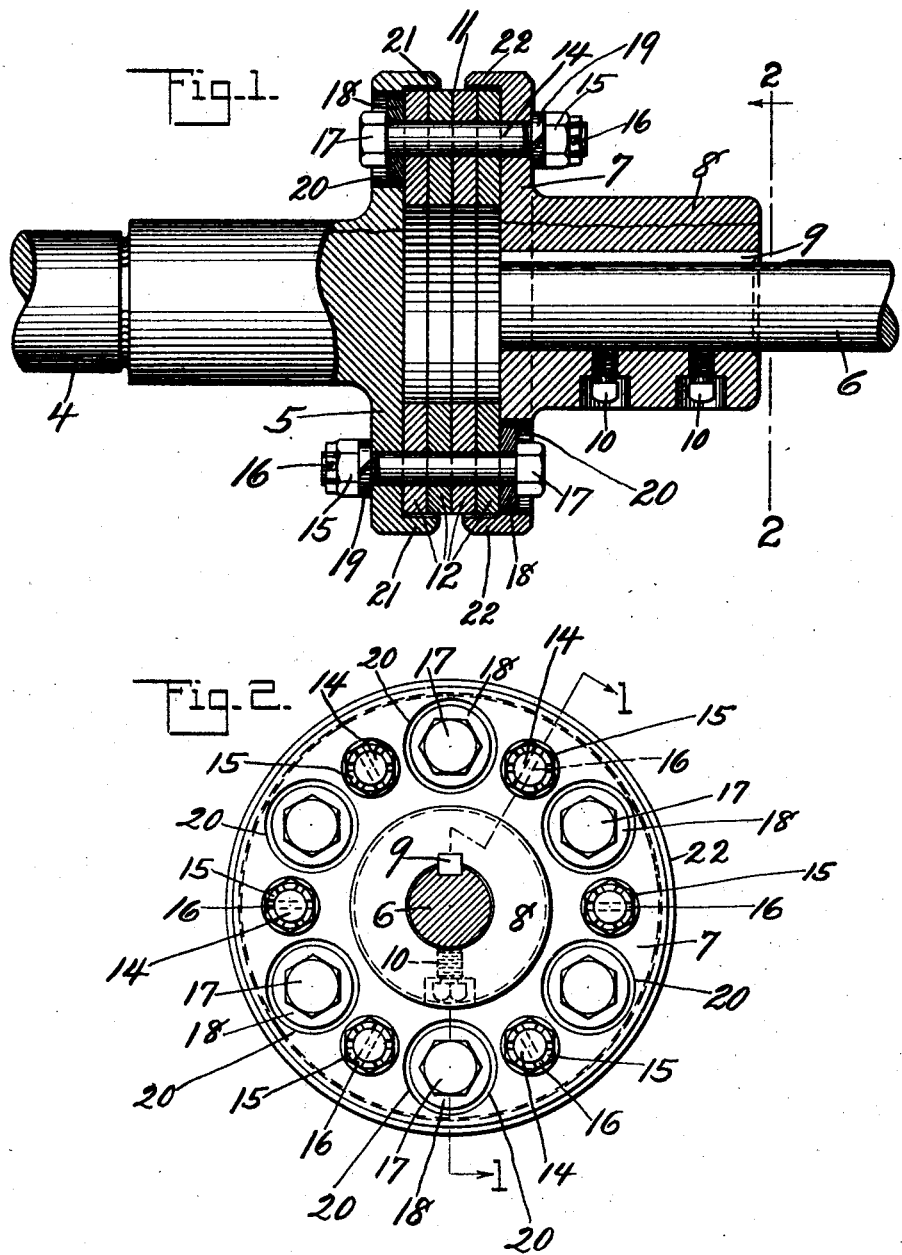
INVENTOR
E. J. Hall
BY
ATTORNEY Patented Jan. 8, 1929.

1,698,160

UNITED STATES PATENT OFFICE.

ELBERT J. HALL, OF DETROIT, MICHIGAN, ASSIGNOR TO AMERICAN CAR AND FOUNDRY MOTORS COMPANY, OF NEW YORK, N. Y., A CORPORATION OF DELAWARE.

SHAFT COUPLING.

Application filed July 22, 1926. Serial No. 124,279.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is partly a side view and partly a longitudinal section through a shaft coupling conveniently embodying my invention,—the section being taken as indicated by the line 1—1 in Fig. 2, but drawn with the upper portion revolved into the plane of the paper.

Fig. 2 is an end view of the coupling from the right of Fig. 1, with the propeller shaft in section as indicated by the line 2—2 in Fig. 1.

My invention relates to cushion drives suitable for propeller shaft assemblies, and especially advantageous in high speed work (e. g., in motor boats) for eliminating noise and vibration from the engines.

As here shown, the tail shaft 4 of the engine is provided with a coupling flange 5 at its rear end, and the propeller shaft 6 is provided with a coupling flange 7 at its forward end. The coupling member 7 is shown as having a hub 8 keyed to the shaft 6 at 9, and made fast and rigid thereon by tightening up the set-screws 10, 10, diametrically opposite the key 9. Between the coupling members 5 and 7 is interposed a cushion disk 11, preferably of yielding elastic character and composed of a plurality of superposed individual annular disk elements 12. These disk elements 12 may be composed of any suitable material, such as rubberized canvas or other fabric in a suitable number of calendered laminæ pressed or vulcanized together. Such discs are in common use for flexible couplings of motor vehicles.

The coupling members 5 and 7 are secured to the cushion disk 11 in alternation, at suitable intervals, by means of tension members in the form of screw-bolts 14. Each of these bolts 14 extends through a close-fitting (but not tight) hole in the coupling member 5 or 7, as the case may be, to which it connects the disk 11. Each bolt 14 has at one end a head in the form of a castellated nut 15, by means of which the bolt may be drawn tight,—a cotter pin key 16 being employed to lock the nut 15 against unscrewing. At its other end, the bolt 14 has a head 17 for clamping the disk 11, here shown as integral with the shank of the bolt, and as supplemented with a thick, heavy washer 18 of larger size, preferably fitting the bolt shank closely but not tightly. A heavy lock washer 19 may be employed under the nut 15, to help in maintaining the compressive tension of the bolt 14 on the disk 11. The head 17, and washer 18, of each bolt 14 lies in an opening 20 (a round hole) in the coupling flange 5 or 7 (as the case may be) to which said bolt does not connect the coupling disk 11. The flange opening 20 affords a substantial clearance around the larger portion 18 of the bolt head. The coupling flanges 5, 7 may be provided with lateral flanges 21, 22, at their peripheries. These flanges 21, 22, surround the outer peripheries of the individual disc elements 12 of the disk 11 with slight clearance, and serve to prevent any portion from flying off by centrifugal force in case of a rupture of one or more of said members 12.

Normally, the coupling flange openings 20 afford ample clearance around the larger bolt head portions 18, so that the torque is transmitted entirely through the cushion disc 11 by virtue of its connections to the flanges 5, 7 at the bolts 14. If the cushion disk material should become so compressed, however, that the bolts 14 are no longer tight, then the connections through the disk will become ineffective, and the bolt will engage the walls of the openings 20 and pick up the torque load. This will happen in the openings 20 of at least one of the flanges 5, 7, and with suitable proportioning of the parts, it may happen concurrently for both flanges. Thus total failure of the coupling under such conditions is avoided. even though the bolts 14 may tend to bend somewhat out of parallel with the center line of the shafts 4, 6.

What is claimed is:

1. In a propeller shaft coupling, a pair of opposed coupling members having pairs of registering openings, one of each pair of which being relatively large, a flexible driving connection interposed between the coupling members, bolts passing through the registering openings and driving connection, and a washer upon one end of each bolt and accommodated in the relatively large openings and having their edges slightly spaced from the walls thereof and adapted to engage such walls to afford a driving connection between the coupling members should the flexible driving connection become inoperative, said coupling members being formed with flanges at their peripheries and said flanges being extended toward each other and surrounding the peripheries of the driving connection elements to prevent distortion of the latter.

2. In a propeller shaft, a pair of opposed flanged coupling members having pairs of registering openings, one of the openings of each member being relatively large, a flexible driving connection interposed between said coupling elements, bolts passed through the registering openings of said members and through openings in the driving connection, a heavy washer on each bolt adjacent its head disposed in the enlarged opening of the adjacent coupling member, the head of each bolt being normally seated in the adjacent opening and the coupling members being provided with lateral flanges opposed to each other and loosely embracing the peripheral edge of the bolt washers and the driving elements, said openings of the coupling members affording clearance around the bolt heads, whereby when the connections through the coupling members becomes ineffective the bolts will engage the walls of the enlarged openings and pick up the torque load.

In witness whereof I have hereunto set my hand.

ELBERT J. HALL.